United States Patent [19]

Saito et al.

[11] 3,898,270

[45] Aug. 5, 1975

[54] N-METHYL-N-ALKOXYCARBONYLMETHYL-N'-(2-METHYL-4-CHLOROPHENYL)-FORMAMIDINES

[75] Inventors: Junichi Saito; Akio Kudamatsu; Tatsuo Tamura; Shozo Sumi, Norihisa Morishima, all of Tokyo, Japan

[73] Assignee: Bayer Aktiengesellschaft, Leverkusen, Germany

[22] Filed: Nov. 22, 1972

[21] Appl. No.: 308,927

[30] Foreign Application Priority Data
Nov. 29, 1971 Japan.............................. 46-95221

[52] U.S. Cl.............................. 260/471 A; 424/309
[51] Int. Cl............................................ C07c 101/44
[58] Field of Search................................ 260/471 A

[56] References Cited
OTHER PUBLICATIONS
Finar, I. L., Organic Chemistry, Vol. I, (1963), Pub. by Richard Clay of Grt. Britian, QD.251F56 – page 567 relied on.

*Primary Examiner*—Robert Gerstl
*Assistant Examiner*—L. A. Thaxton
*Attorney, Agent, or Firm*—Burgess, Dinklage & Sprung

[57] ABSTRACT

N-methyl-N-alkoxycarbonylmethyl-N'-(2-methyl)-4-chlorophenyl)-formamidines of the formula

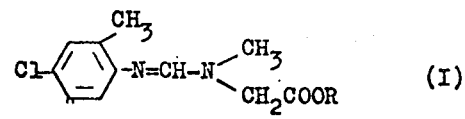

in which
R is an alkyl radical of 1 to 6 carbon atoms which possess acaricidal properties.

5 Claims, No Drawings

N-METHYL-N-ALKOXYCARBONYLMETHYL-N'-(2-METHYL-4-CHLOROPHENYL)-FORMAMIDINES

The present invention relates to and has for its objects the provision of particular new N-methyl-N-alkoxycarbonylmethyl-N'-(2-methyl-4-chlorophenyl)-formamidines which possess acaricidal properties, active compositions in the form of mixtures of such compounds with solid and liquid dispersible carrier vehicles, and methods for producing such compounds and for using such compounds in a new way especially for combating acarids with other and further objects becoming apparent from a study of the within specification and accompanying examples.

Among the various kinds of pests that are parasitic on plants and animals, mites are known that cause serious harm to fruit-trees, general crops and cattle. Plant-inhabiting mites that are particularly harmful are the spider mites. The damage caused by the European red mite, citrus red mite, sweet cherry spider mite and two-spotted spider mite, which inhabit apple trees, Japanese orange trees and pear trees, is particularly serious, so that a great amount of many must be spent every year on controlling these mites.

For the control of these mites there have hitherto been used compounds such as 2,4,5,4'-tetrachlorodiphenylsulfone (Tedion), 4-chlorophenyl-4'-chlorobenzenesulfonate (CPCBS) and ethyl 4,4'-dichlorobenzylate (chlorobenzilate). However, owing to the fact that acaricide-resisting strains of mites emerge more rapidly than is the case with other kinds of pests, the effective control of mites is becoming more and more difficult. To solve this problem, there is a great demand for a new and effective acaricide.

A few years ago, Japanese Patent Publication No. 10379/1967 disclosed the fact that formamidine compounds exhibit insecticidal, acaricidal, fungicidal and herbicidal activities. In fact, the formamidine compound having the formula

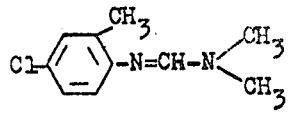

was selected as being the most effective acaricide from a number of conventional acaricides and it has been put to use under the general name of "chlorphenamidine" as well as under the tradename of "Galecron".

The present invention provides, as new compounds, formamidine derivatives of the formula

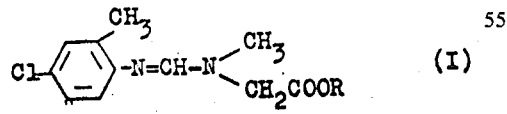

in which:

R is an alkyl radical of 1 to 6 carbon atoms.

Thus R may, for instance, be methyl, ethyl, n- or isopropyl, n-, sec.-, iso- or tert.-butyl, n-, iso-, neo-or tert.-amyl or n- or isohexyl. R is preferably lower alkyl.

The present invention also provides a process for the preparation of a compound of the fomula (I) above, in which (a) an N-(4-chloro-2-methylphenyl)formamino alkyl ether of the formula

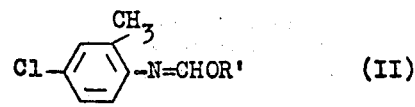

is reacted with a sarcosine alkyl ester of the formula

or (b) 2',2',2'-trichloroethylidene-2-methyl-4-chloroaniline, which has the formula

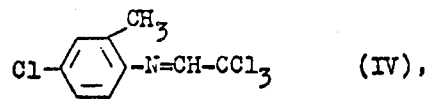

is reacted with a sarcosine alkyl ester of the formula (III) above, or (c) 4-chloro-2-methylaniline, which has the formula

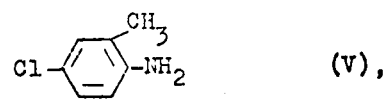

is reacted, in the presence of a halogenating agent, with a formamide of the formula

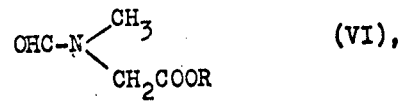

or (d) 4-chloro-2-methylaniline, of the formula (V) above, is reacted with hydrogen cyanide (HCN) and a sarcosine alkyl ester of the formula (III) above, or (e) 4-chloro-2-methylphenyl isocyanate, which has the formula

is reacted with a formamide of the formula (VI) above, in which formulas

R has the meaning stated above, and

R' is an alkyl radical of 1 to 6 carbon atoms.

Examples of the ethers of the formula (II) are N-(4-chloro-2-methylphenyl)formamino ethyl ether and N-(4-chloro-2-methylphenyl)formamino n- or isopropyl ether.

Examples of the esters of the formula (III) are sarcosine methyl ester, sarcosine ethyl ester, sarcosine n-(or iso-)propyl ester, sarcosine n-(or iso-, sec.- or tert.-) butyl ester, sarcosine n-(iso-, neo- or tert.-) amyl ester and sarcosine n-(or iso-)hexyl ester.

Suitable halogenating agents for use in process variant (c) are thionyl chloride, phosgene, phosphorus oxychloride, and phosphorus pentachloride. The condensation product of the formamide (VI) and the halogenating agent can be reacted with the aniline (V).

The reaction of any of the above process variants may be carried out in the presence of a solvent that does not retard the reaction (a non-interfering solvent). Preferred solvents or diluents are aliphatic, alicyclic and aromatic hydrocarbons (which may be chlorinated) such as hexane, cyclohexane, petroleum ether, ligroin, benzene, toluene, xylenes, methylene chloride, chloroform, carbon tetrachloride, mono-, di- and trichloroethylene and chlorobenzene; ethers, such as diethyl ether, dimethyl ether, diisopropyl ether, dibutyl ether, ethylene oxide, dioxane and tetrahydrofuran; ketones, such as acetone, methyl ethyl ketone, methyl isopropyl ketone and methyl isobutyl ketone; nitriles, such as acetonitrile, propionitrile and acrylonitrile; alcohols such as methanol, ethanol, isopropanol, butanol and ethylene glycol; esters such as ethyl acetate and amyl acetate; acid amides such as dimethyl formamide and dimethyl acetamide; sulfones and sulfoxide amides, such as dimethyl sulfoxide and sulfolane; and bases, such as pyridine.

The reaction temperature of any of the process variants according to the present invention may be within a wide range. The reactions are generally carried out at a temperature of about −20°C to the boiling point of the reaction mixture, preferably at a temperature of about 0° to 200°C or to the boiling point of the mixture, whichever is the lower.

The reaction is preferably carried out under normal pressure, although it may be carried out under elevated or reduced pressure. Process variant (a) may be represented by the following equation:

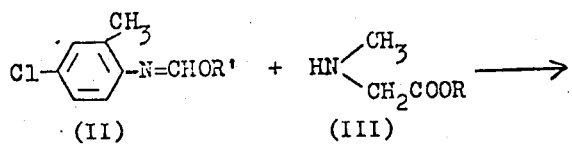

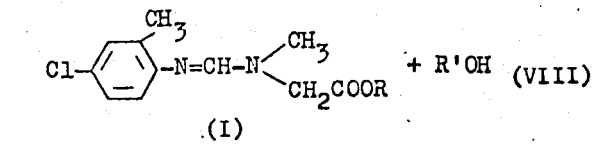

in which:
R and R' are identical or different $C_1$–$C_6$ alkyl radicals.

The other process variants may be represented as follows:

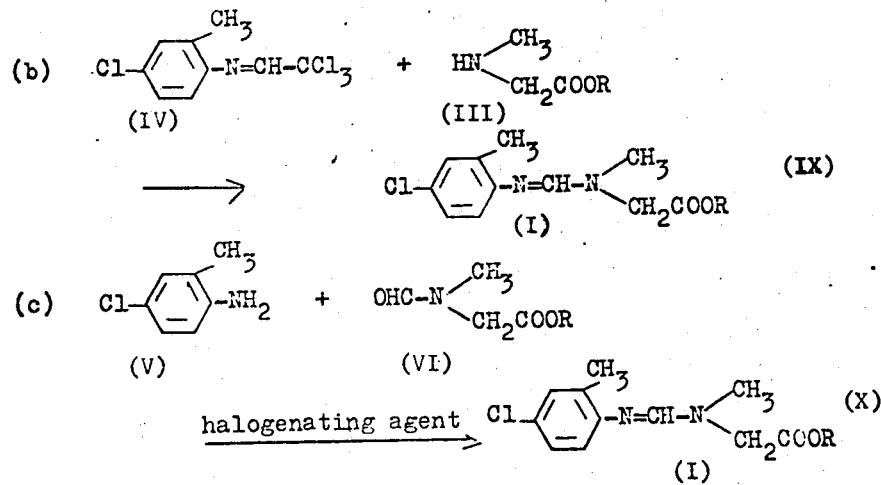

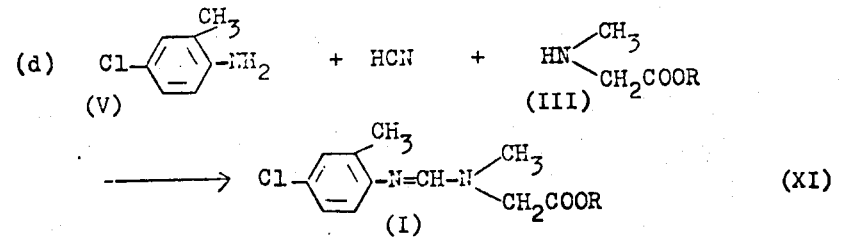

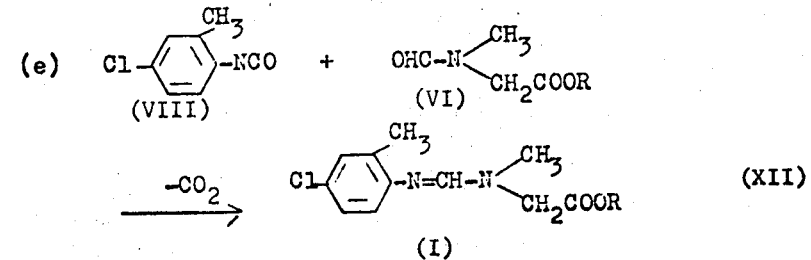

It has been found that the present compounds of the general formula (I) have a greater acaricidal activity than the prior-art compound chlorphenamidine mentioned above, and that they exhibit an excellent killing effect against mites at any stage of their development, whether adult, larva or egg, while showing not only a low toxicity to warm-blooded animals but also a long residual effect. The novel compounds according to the present invention are therefore very useful as acaricides.

The present compounds can be used for controlling various kinds of mites (Acarina), for example Tetranychidae (spider mites), such as *Tetranychus cinnabarinus* (carmine mite), *Panonychus citri* (citrus red mite), *Panonychus ulmi* (European red mite), *Eotetranychus sexmaculatus* (six-spotted spider mite), *Eotetranychus kankitus* (Miyake spider mite), *Tetranychus viennensis* (sweet cherry spider mite), *Tetranychus urticae* (two-spotted spider mite), *Bryobia praetiosa* (clover mite), *Bryobia rubrioculus* (brown mite), *Eotetranychus smithi* (Smith spider mite) and *Tetranychus kanzawai* (Kanzawa spider mite); Tenuipaldae (False spider mites), such as *Brevipalpus lewisi* (citrus flat mite) and *Tenuipalpus zhizhilashviliae* (persimmon false spider mite); Eriophyidae (Eriophyid mites), such as *Aculops pelekassi* (Japanese citrus rust mite) and *Calepitrimerus vitis* (grape rust mite or leaf mite); Tarsonemidae (Tarsonemid mites), such as *Tarsonemus pallidus* (cyclamen mite); and Acaridae (Acarid mites) such as *Rhizoglyphus echinopus* (Bulb mite).

Futhermore, compounds of the present invention are also useful as acaricides for controlling mites inhabiting the bodies of cattle and domestic fowls, such as mites of the Ixodoides group as well as the "Mealia" group.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Possible adjuvants include organic matter; stabilizers; adhesive agents, for example soap, calcium caseinate, sodium alginate, polyvinyl alcohol, steeping agents, coumarone (or indene) resins or polyvinyl butyl ether; phytotoxicity-reducing substances, for example zinc sulfate, ferrous chloride or copper nitrate; substances for prolonging the biological effect, for example chlorinated terphenyls; emulsion-stabilizing substances, for example casein, gun tragacanth and carboxymethyl cellulose (polyvinyl alcohol also being suitable for this purpose); and effect-promoting agents.

The compounds of the present invention can, if desired, be applied with other agricultural chemicals such as insecticides, acaricides, nematocides, antiviral agents, fungicides, herbicides, plant-growth regulators and attractants (which classes of compounds include certain phosphoric acid esters, carbamates, dithio or thiol carbamates, chlorinated organic compounds, dinitro compounds, organosulfur and organometallic compounds, antibiotics, substituted diphenyl ethers, ureas, and triazines), as well as with fertilizers.

The ready-to-use preparations (which may be prepared from suitable formulations by, for instance, dilution with water) may be applied in any usual manner, for instance, by spraying, such as liquid spraying, misting, atomizing, dusting, scattering, watering, pouring, fumigating, by soil application, such as mixing, sprinkling, vaporising and irrigating, by surface application, such as painting, banding and dressing (dust-coating), or by immersion.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–20%, preferably 0.005–10%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably icluding a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.1–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 3 to 1000 g/hectare, preferably 30 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

mole) of sarcosine ethyl ester were dissolved in 200 ml of toluene and the solution was heated under reflux for 4 hours to complete the reaction.

The reaction solution was treated with active charcoal and was filtered. From the filtrate thus obtained, the toluene was removed under reduced pressure and the residue was subsequently distilled under reduced pressure to obtain 23.6 g (yield: 88%) of N-methyl-N-ethoxycarbonylmethyl-N'-(2-methyl-4-chlorophenyl)-formamidine having a boiling point of 163°–165°C/0.9mm Hg. The product is referred to hereinafter as compound No. 2.

Other active compounds of the present invention, which were prepared according to similar procedures, are shown in Table 1.

Table 1

| Compound No. | Structural formula | Boiling point |
|---|---|---|
| 1 | Cl—⟨phenyl with CH$_3$⟩—N=CH—N(CH$_3$)(CH$_2$COOCH$_3$) | 151–152°C/0.4mm Hg |
| 3 | Cl—⟨phenyl with CH$_3$⟩—N=CH—N(CH$_3$)(CH$_2$COOC$_3$H$_7$-iso) | 153–155°C/0.4mm Hg |

Furthermore, the present invention contemplates methods of selectively killing, combating or controlling pests, e.g. acarids, which comprises applying to at least one of correspondingly (a) such acarids, and (b) the corresponding habitat thereof, i.e. the locus to be protected, a correspondingly combative or toxic amount, i.e. an acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

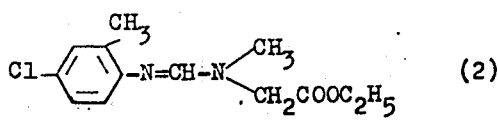

(2)

19.7 g (0.1 mole) of N-(4-chloro-2-methylphenyl)formimino ethyl ether and 11.7 g (0.1

The acaricidal compositions of this invention are illustrated in and by the following Examples, in which the active compounds are identified by the numbers assigned to them in Example 1 and Table 1. Parts are by weight.

EXAMPLE 2 (Wettable powder)

15 parts of compound No. 1, 80 parts of a mixture of diatomaceous earth and Kaolin (1:5) and 5 parts of a polyoxyethylene alkylaryl ether were ground and mixed and then formulated into a wettable powder. This formulation was diluted with water before being applied by spraying.

EXAMPLE 3 (Emulsion)

30 parts of compound No. 2, 30 parts of xylene, 30 parts of high-boiling-point aromatic hydrocarbons and 10 parts of a polyoxyethylene alkylaryl ether were mixed and stirred to from an emulsifiable concentrate. The formulation was diluted with water before being applied.

EXAMPLE 4 (Powder)

2 parts of compound No.2 and 98 parts of a mixture of talc and clay (1:3) were ground and mixed to from a powder suitable for application.

EXAMPLE 5 (Powder)

1.5 parts of compound No.3, 2 parts of an organo-phosphate, 0.5 parts of isopropyl hydrogen phosphate (PAP) and 96 parts of a mixture of talc and clay (1:3) were ground and mixed to form a powder. This formulation was applied by spraying.

EXAMPLE 6 (Granules)

10 parts of compound No.3, 10 parts of bentonite, 78 parts of a mixture of talc and clay (1:3) and 2 parts of lignin sulfonate were mixed and then 25 parts of water were added thereto. The mixture, after being well kneaded, was formulated by means of an extruding granulator into granules of 20–40 mesh, which were then dried at 40°–50°C. This formulation was applied by scattering.

EXAMPLE 7 (Granules)

95 parts of clay granules having a size distribution from 0.2 to 2mm were placed in a rotary mixer and, while being stirred, were exposed to a spray of 5 parts of compound No.1 dissolved in an organic solvent, whereby the granules were uniformly wetted. This was followed by drying at from 40° to 50°C to form coated granules suitable for application.

The present active compounds exhibit greater acaricidal potency than active compounds having similar chemical structures and which have been described in the literature, yet with only a very low toxicity against warm-blooded animals. Therefore, the present active compounds are of very high value in actual practice. The excellent acaricidal activity of the present compounds is illustrated in and by the following test Examples in which the present active compounds are identified by the numbers assigned to them in Example 1 and Table 1.

EXAMPLE 8

Test on Citrus Red Mites (*Panonychus Citri*)

Preparation of Test Formulation
  Solvent: 3 parts by weight of dimethyl formamide
  Emulsifier: 1 part by weight of alkylarylglycol ether To prepare a suitable formulation of an active compound, one part by weight of the compound in question was mixed with the above-specified amount of solvent comprising the above-specified amount of emulsifier and this mixture was diluted with water to the required concentration.

Test Procedure

A young Japanese orange tree cultivated in a pot 9 cm in diameter was inoculated with 50–100 imagines and young of the citrus red mite and, after 2 days, 40 ml of an aqueous formulation of the active compound, which formulation was prepared as stated above, was sprayed onto the pot.

The so-treated pot was investigated to evaluate the contolling effect after having been allowed to stand in a greenhouse for two weeks. The rating was as follows:

3: No living imaginal and young mites
2: less than 5% of living imaginal and young mites, calculated with respect to an untreated control
1: 5–50% of living imaginal and young mites, calculated with respect to an untreated control
0: Over 50% of living imaginal and young mites, calculated with respect to an untreated control.

The results are given in the following Table.

Table 2

| Compound No. | Test results for citrus red mites (*Panonychus citri*) | | |
|---|---|---|---|
| | Concentration of active ingredient (% by weight) | Control effect on the mites | Percentage of living imaginal & young mites |
| 1 | 0.1 | 3 | 0 |
| | 0.03 | 3 | 0 |
| | 0.01 | 2 | 1.2 |
| 2 | 0.1 | 3 | 0 |
| | 0.03 | 3 | 0 |
| | 0.01 | 3 | 0 |
| 3 | 0.1 | 3 | 0 |
| | 0.03 | 3 | 0 |
| | 0.01 | 2 | 0.5 |
| Commercially available control | 0.1 | 3 | 0 |
| | 0.03 | 3 | 0 |
| | 0.01 | 1 | 44.5 |

Note: the control was N'-(2-methyl-4-chlorophenyl)-N,N-dimethyl formamidine (common name: chlorphenamidine; tradename: Galecron)

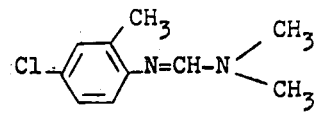

EXAMPLE 9

Test of Ovicidal Effects on Citric Red Mites (*Panonychus Citri*)

Test Procedure

A grown leaf from an Onshu orange tree was punched by a cork borer having a diameter of 2 cm and the resultant disc was placed on a filter paper that was kept wet with water.

The leaf disc was with for 10 female imagines of the citrus red mite, which laid eggs for 48 hours thereon. Before the treatment, the imaginal mites were removed from the leaf disc. The active-compound disc bearing the eggs was immersed in the active-compoun formulation (prepared as described in Example 8) for 5 seconds. After the emulsion had dried, the leaf disc was again placed on the wet filter paper. After 5 days, the extent to which the eggs had failed to hatch on the leaf disc was investigated by means of a binocular microscope and the ovicidal effect of the formulation was determined.

This test was carried out in a chamber wherein a temperature of 28°C was maintained.

The results are reported in Table 3.

Table 3

| Test results of ovicidal effect on citrus red mites (*Panonychus citri*) | | |
|---|---|---|
| Compound No. | Concentration of active ingredient (% by weight) | Ovicidal effect on the mites (%) |
| 1 | 0.1 | 100 |
|   | 0.03 | 93 |
|   | 0.01 | 49 |
| 2 | 0.1 | 100 |
|   | 0.03 | 90 |
|   | 0.01 | 56 |
| 3 | 0.1 | 100 |
|   | 0.03 | 85 |
|   | 0.01 | 42 |
| Commercially available control | 0.1 | 100 |
|   | 0.03 | 54 |
|   | 0.01 | 12 |
| Non-treatment | — | 0 |

Note: the commercially available control was the same as in Example 8.

It will be appreciated that the instant specification and examples are set forth by way of illustration and not limitation, and that various modifications and changes may be made without departing from the spirit and scope of the present invention

What is claimed is:

1. An N-methyl-N-alkoxycarbonylmethyl-N'-(2-methyl-4-chlorophenyl)-formamidine of the formula

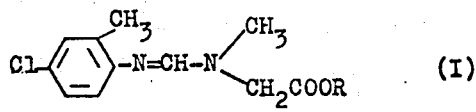   (I)

in which
R is an alkyl radical of 1 to 6 carbon atoms.

2. The compound according to claim 1 wherein R is lower aklyl.

3. The compound according to claim 1 wherein such compound is N-methyl-N-methoxycarbonylmethyl-N'-(2-methyl-4-chlorophenyl)-formamidine of the formula

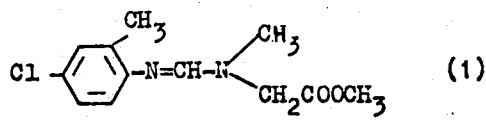   (1)

4. The compound according to claim 1 wherein such compound is N-methyl-N-ethoxycarbonylmethyl-N'-(2-methyl-4-chlorophenyl)-formamidine of the formula

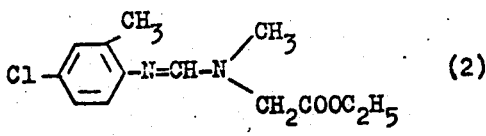   (2)

5. The compound according to claim 1 wherein such compound is N-methyl-N-isopropoxycarbonylmethyl-N'-(2-methyl-4-chlorophenyl)-formamidine of the formula

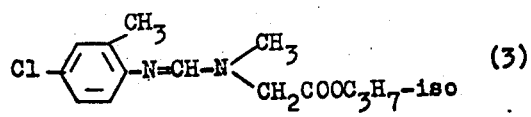   (3)

* * * * *